UNITED STATES PATENT OFFICE.

USHITARO MATSUURA, OF OTAGI-GUN, KYOTO-FU, JAPAN.

MEDICINE.

1,346,132.  Specification of Letters Patent.  Patented July 13, 1920.

No Drawing.  Application filed June 29, 1917.  Serial No. 177,831.

*To all whom it may concern:*

Be it known that I, USHITARO MATSUURA, a subject of the Emperor of Japan, resident of No. 2 Nagareta, Tanaka, Tanaka-Mura, Otagi-Gun, Kyoto-Fu, Japan, have invented a certain new medicine, "Pityrol," for external use for skin diseases, consisting of a tarry matter obtained by the dry distillation of rice-bran or wheat-bran, and of which the following is a specification.

I have found after many experiments that the black or brownish black tarry matter obtained by the dry distillation of rice-bran or wheat-bran is very efficacious to many skin diseases and is superior to ichthyol, wood-tar, chrysarobin, tumenol, etc., in its medical action. The name "Pityrol" (meaning bran-oil) was suggested for this new medicine.

A quantity of rice-bran or wheat-bran is introduced in an iron retort and dry distilled by direct fire, the temperature being gradually raised and then finally distilled at 500–700 C. The tarry matter collected in the receiver is separated from the water distillate. The tarry matter "Pityrol" thus obtained is a very efficacious medicine for many skin diseases and can be used as the better substitute for ichthyol, wood-tar, chrysarobin, tumenol, anthrasol, sulfur, iodoform, xyloform, etc., because of the fact that "Pityrol" has no by-reaction while the latter medicines have it. Moreover, "Pityrol" has a characteristic action that it neutralizes the incentive actions of the medicines above mentioned when used together with them.

Having now described my invention, what I claim is:

1. A new medicine for skin diseases comprising the distillate obtained by the dry distillation of rice-bran or wheat-bran.

2. A new medicine for skin diseases comprising the distillate obtained by the dry distillation of rice-bran or wheat-bran, and from which water has been separated.

In testimony whereof I affix my signature in presence of two witnesses.

USHITARO MATSUURA.

Witnesses:
W. EBIBARAK,
T. HIAHIA, D. D.